April 17, 1956   A. McL. NICOLSON ET AL   2,742,578
INFRARED IMAGE DETECTING SYSTEM
Filed May 27, 1953
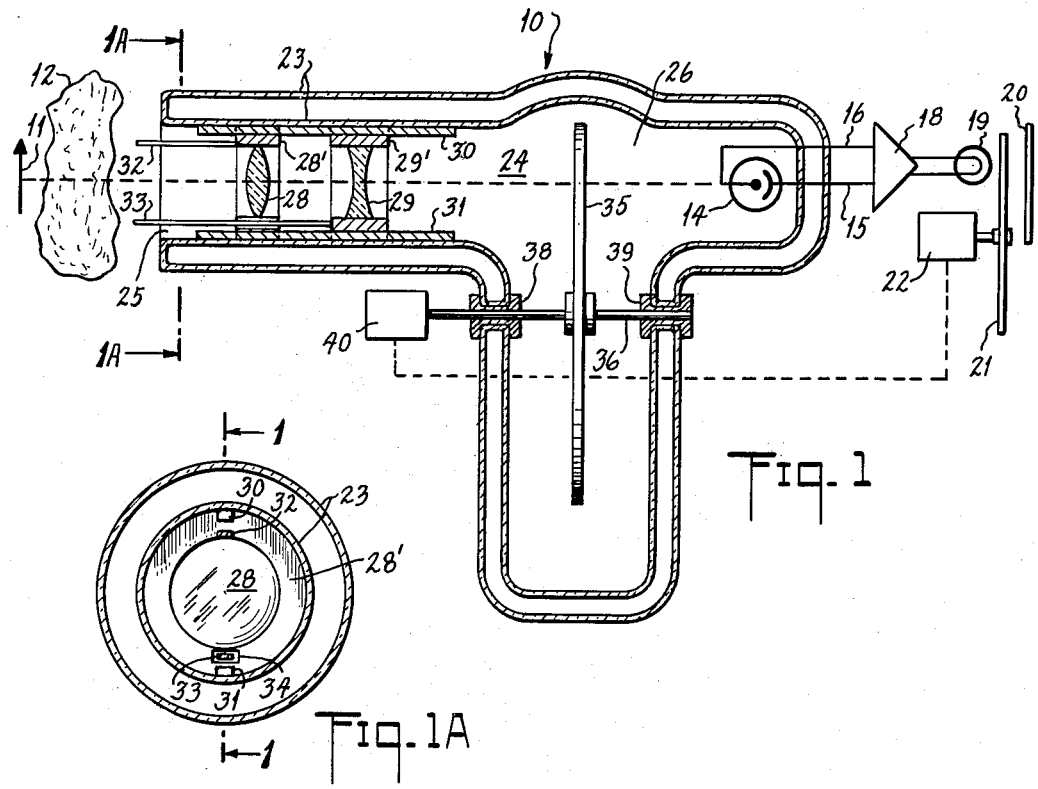
Fig. 1
Fig. 1A
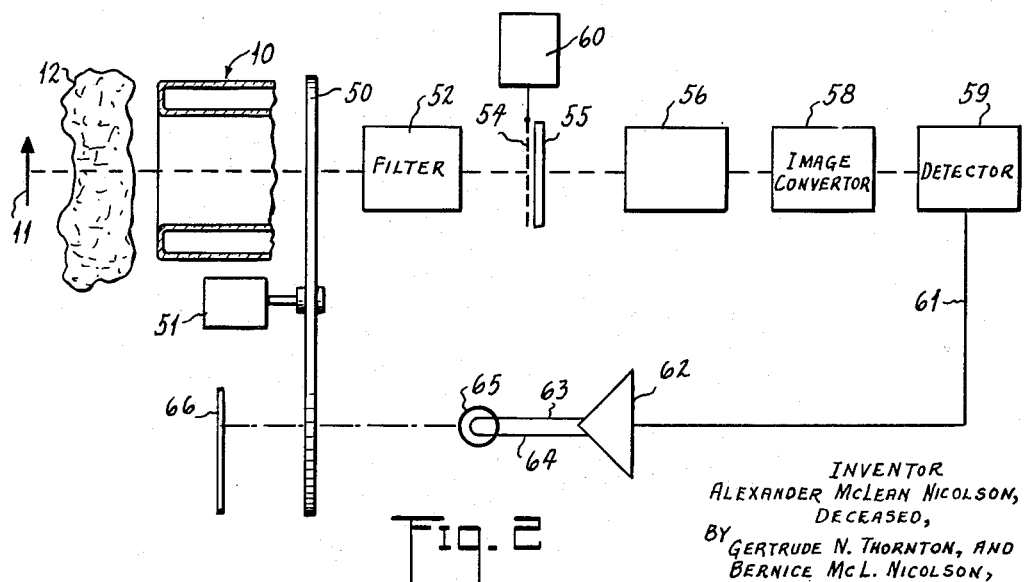
Fig. 2
INVENTOR
ALEXANDER MCLEAN NICOLSON,
DECEASED,
BY GERTRUDE N. THORNTON, AND
BERNICE McL. NICOLSON,
EXECUTRICES,
BY
Campbell, Brumbaugh, Free & Graves
ATTORNEYS

2,742,578
INFRARED IMAGE DETECTING SYSTEM

Alexander McLean Nicolson, deceased, late of New York, N. Y., by Gertrude Nicolson Thornton and Bernice McLean Nicolson, executrices, New York, N. Y.

Application May 27, 1953, Serial No. 357,862

5 Claims. (Cl. 250—83.3)

The present invention relates to radiant energy detection systems and more particularly to methods and apparatuses for detecting the presence and/or location of objects obscured by fog, or some other medium, by means of radiant energy emitted from or reflected from the obscured objects.

It is highly desirable in the operation of moving bodies through fog or similar obscuring mediums, or in night operations to be able to reliably detect the presence or location of objects otherwise invisible to the operator of the moving body. This is especially true in the operation of aircraft during blind flying and in landings during weather conditions where the ceiling is either zero or extremely low. It is well-known that many objects naturally emit forms of radiant energy other than those in the visible light range. Further, some forms of radiant energy may be readily reflected by objects subject to such radiations. Since some of these forms of radiant energy are perceptible from great distances and tend to penetrate mediums which would otherwise be opaque to visible light rays, they readily lend themselves to use in detection systems.

It is an object of the invention, accordingly, to provide novel and useful methods and apparatuses for detecting radiant energy of the above character.

Another object of the invention is to provide novel and useful methods and apparatuses for detecting radiant energy from distant low energy sources and for converting said detected radiant energy into visual or sonic indications representative of the distant sources.

In accordance with the present invention, light radiations, such as infrared rays, either emitted from or reflected from an invisible field of images, such as objects obscured by fog or some other similar medium, may be scanned and projected upon detecting means enclosed within an elongated chamber which is maintained at a subnormally cooled temperature. The light radiation thus detected is then converted into a definable form from which visual or sonic indications of an image of the obscured object may be produced.

Further, the location and/or speed of approach or recession of the object relative to the detector may be determined by the application of the principles of the Doppler effect. This may be accomplished by the interruption of the light radiation before transmission at a sonic or higher frequency and the concomitant transmission of a radio signal representative of the frequency at which the light radiation transmitted from or reflected from the obscured object is interrupted. If the light radiation transmitted from the obscured object is in the form of long-wave radiations, such as infrared radiations, then detectors such as photo-heat, electrical resistance, thermoelectric, or optical detectors may be used.

For a complete understanding of the invention reference should be had to the following detailed description taken in conjunction with the accompanying drawings, in which:

Fig. 1 is a schematic representation, partly in longitudinal section, of a "cold" telescope adapted for scanning an obscured object and converting the detected radiations from the obscured object into visual images, in accordance with the invention;

Fig. 1A is a cross-sectional view taken along the line 1A—1A of Fig. 1, looking in the direction of the arrows, showing the adjusting means for the optical system of the "cold" telescope; and Fig. 2 is a schematic representation of another embodiment of the invention, wherein detected monochromatic light radiations from an obscured object are converted into a visible image which may be spatially definable.

In the following detailed description of representative embodiments of the invention, the light radiations which pass through the obscuring medium from an invisible field of images will be assumed to be infrared radiations, although, it will be obvious that the invention will be susceptible of use with other types of radiations.

Referring now to Fig. 1, a "cold" telescope 10 may be positioned to detect the presence and/or location of an object 11 obscured from the telescope by the fog 12, or some similar obscuring medium. The cold telescope 10 may include a detecting means 14, which is sensitive to a particular form of radiant energy transmitted from the object 11.

The detector 14 may take one of a great variety of forms, and it may comprise, for example, a conventional photoelectric cell or an actinic photoelectric detector. The detector 14 may be connected by the conductors 15 and 16 through an amplifier 18 to a light source 19. The light from the light source 19 may be adapted to be projected upon a viewing screen 20 through a scanning mechanism, such as a scanning disc 21, driven by any suitable driving means 22, for example, a synchronous motor.

The cold telescope 10 may comprise an envelope 23 forming a chamber 24 having an elongated tubular portion 25 and an enlarged cavity 26. The envelope 23 may be a double wall structure, for example, a sealed glass tube. The envelope 23 is utilized to maintain the chamber 24 including the elongated tubular portion 25 and the enlarged cavity 26 at a subnormally cooled temperature thereby permitting the detector to detect radiations emanating from low temperature sources and aiding in the optical resolution of the radiant energy to be detected. The subnormal cooling of the chamber 24 may be accomplished in any suitable manner. For example, a liquid refrigerant may be enclosed within the double wall envelope 23, heat-proof packing material may be either enclosed within the envelope or disposed around it, or a sealed vacuum may be maintained within the double walls of the envelope 23.

In order to concentrate the radiant energy effectively upon the detector 14, a lens structure such as that of the well-known Galilean telescope may be utilized. This lens structure may consist of a converging lens 28 and a diverging lens 29, adjustably mounted on the slides 30 and 31 for longitudinal movement with respect to the axis of the tubular portion of the envelope 23 within the elongated tubular portion 25 of the chamber 24. Any suitable means may be utilized to adjust the positions of the two lenses 28 and 29. For example, two adjusting rods 32 and 33 may be connected to the supporting rims 28' and 29' of the lenses 28 and 29, respectively. The adjusting rod 33 connected to the supporting rim 29' passes through an aperture 34 in the supporting rim 28', as shown in Fig. 1A. Thus the positions of the converging lens 28 and the diverging lens 29 may be readily adjustable relative to each other and to the detecting means 14.

Within the enlarged cavity 26 disposed between the optical system of the lenses 28 and 29 and the detecting means 14, there may be disposed a suitable scanning mechanism, for example, a scanning disc 35, positioned so that the radiant energy transmitted through the optical system of the lenses 28 and 29 may be selectively scanned and directed to the detecting means 14. The scanning disc 35 may be fixedly mounted on an axle 36 supported within the envelope 23 by the support members 38 and 39, which may be conventional bushings of any suitable type. The scanning disc 35 may be driven by a driving means 40, for example, a synchronous motor, which may be operated in synchronism with the motor 22 driving the scanning disc 21.

The scanning discs 21 and 35 may be in the form of conventional mechanical television scanning discs with a plurality of apertures arranged in a helical fashion in the peripheral portions of the discs.

In operation, the cold telescope of Fig. 1 might be mounted on an aircraft for use in an infrared fog landing system, wherein a marker or beacon located on or near the landing strip, or some other form of marking actually on or incorporated into the landing strip would transmit infrared radiations of a given frequency which would be susceptible of detection by the aircraft. The object 11 in Fig. 1 is representative of such a transmitter of infrared radiations. The cold telescope 10 might be fixedly mounted or adjustably mounted for universal scanning on some portion of the aircraft. When the object 11 comes into the scanning field of the cold telescope 10, infrared rays which pass through the fog or other obscuring medium 12 are operated on by the focusing system comprising the converging lens 28 and the diverging lens 29.

Thus the infrared rays from the object 11 pass through the tubular portion of the cold telescope 10 in such a manner as to form an image therein. This image is chopped into discrete portions by the operation of the scanning disc 35. These portions impinge upon the photo-electric detecting means 14. The impingement of the infrared rays upon the detecting means 14 in turn causes an electrical current flow through the conductors 15 and 16 which is amplified in the amplifier 18 and then serves to control the intensity of the light source 19.

The scanning disc 21 scans the light from the light source 19 and chops the light into discrete portions of visible light which are projected upon the viewing screen 20. Since the scanning disc 21 and the scanning disc 35 are operated in synchronism, a visible image of the object 11 will appear on the viewing screen 20 and be spatially definable.

In order to obtain an indication of the speed of approach or recession of the aircraft relative to the object 11, the infrared radiations may be interrupted at a sonic or higher frequency before transmission from the object 11 and radio signals representative of the frequency of interruption of the infrared radiations from the object 11 could be transmitted to the aircraft. The frequency of interruption of the infrared radiations could then be detected at the aircraft. Therefore, the aircraft would be provided with an indication of the apparent frequency of interruption of the infrared radiations and also the true frequency, as transmitted by the radio signals from the object 11. This information could be used to determine the speed of approach or recession of the aircraft relative to the object by the application of the principles of the Doppler effect.

It is readily apparent that the lens system of the lenses 28 and 29 is not necessary to the functioning of the detector so long as the infrared radiations can be properly optically oriented within the chamber so as to be projected effectively upon the detecting means 14.

Further, the scanning apparatus could be positioned outside the cold telescope 10. Also, it would be obvious to one skilled in the art that the entire cold telescope structure might be adjustably mounted for manual or automatic scanning of an invisible field of images. In addition, any conventional form of reflecting device, such as a concave mirror, or refracting device, such as a prism, may be used in directing the desired radiations into the cold telescope.

It will be apparent that the infrared radiations detected by the cold telescope detector may be converted into visual or sonic indications by a great variety of means. For example, the detecting means 14 may be an electrical resistance element or screen comprising a plurality of electrical resistance elements subject to resistance variations dependent upon changes in temperature of the intercepted radiations constituting an image. Such a detecting means might comprise a Bolometer, wherein changes in the electrical resistance of a blackened platinum strip which is exposed to the infrared radiations would be used to control a glow discharge resulting in the projection of visible representations of the object upon the viewing screen.

Another form of detecting means may incorporate expansion elements wherein the infrared radiations from the invisible field of images would be projected upon the surface of a field of microscopic fluid or solid particles resulting in the expansion of the particles in response to the radiations. Simultaneously a "cold" light (a white light minus the red spectrum) would be projected upon the microscopic fluid or solid particles thus causing the reflected light to reproduce an image of the infrared radiating object.

Also, multiple bimetallic elements could be subjected to the detected light radiation simultaneously with a "cold" light, thereby reflecting an image corresponding to the image carried by the detected light radiations. Still another form of detector may utilize bimetallic expansion surfaces of differentiated metallic films or screens, directly or indirectly adhered together, upon which "cold" light may be reflected or refracted to render visible the otherwise invisible intercepted images.

Further types of detectors may involve the projecting of the detected radiations on oil or soap films, in air, or on a differentially expanding fluid simultaneously with "cold" light, and detecting interference bands produced by the relative expansions due to the detected light radiations therein or thereupon. Thus the otherwise invisible light radiations may be rendered visible.

In Fig. 2, another embodiment of the invention may comprise the cold telescope 10, a scanning disc 50 driven by a conventional driving means 51, a monochromatic light filter 52, a diffraction grating 54, a screen 55, an optical focusing system 56, an image convertor 58, and a detector 59. The diffraction grating 54 may be vibrated by a vibrating mechanism 60, which may be of any conventional type. The detector 59 may be connected through a conductor 61 to an amplifier 62, which in turn may be connected through the conductors 63 and 64 to a visible light source 65. A viewing screen 66 may be positioned to receive visible light radiations from the light source 65 which pass through apertures in the scanning disc 50. The scanning disc 50 may be of any suitable type, such as a conventional television scanning disc similar to the scanning discs 21 and 35 of Fig. 1. The image convertor 58 may comprise a fluorescing medium of a fluid or a transparent substance. The detector 59 may be a conventional actinic photo detector.

In operation, infrared radiations from the object 11 pass through the obscuring medium 12 and are intercepted by the cold telescope 10. The infrared radiations may be directed into the cold telescope in any suitable manner, such as by the aforementioned reflecting or refracting devices. The intercepted infrared radiations are then scanned by the scanning disc 50, after which the chopped portions of infrared radiations are filtered by the monochromatic light filter 52. The resultant chopped portions of monochromatic infrared radiations are then passed through the diffraction grating 54 to establish an interference pattern on the screen 55. In order to eliminate the effect of shadows from the opaque portions of the diffraction grating 54 in the interference pattern, the diffraction grating 54 is vibrated. The diffraction grating 54 serves to optically reinforce and condense the intercepted infrared radiations.

The optically reinforced and condensed infrared radiations are optically focused by the focusing system 56 on the image convertor 58. The infrared radiations then operate upon the fluorescing medium of the image convertor 58 to quench the fluorescence, thereby providing visible indications of the presence of the infrared radiations. The visible indications are then detected by the actinic photo detector 59.

The detected signal is then amplified and utilized to control the luminosity of the light source 65. The visible light from the source 65 is then scanned by the scanning disc 50 and projected upon the viewing screen 66 to establish a visible image of the object 11. Since the visible light from the source 65 is being simultaneously scanned by the scanning disc 50 along with the intercepted infrared radiations, the image upon the viewing screen 66 will be spatially determined. It will be obvious that separate scanning means operated in synchronism could be substituted for the single scanning disc 50 to perform the same function.

Thus it is apparent that novel and extremely useful methods and apparatuses have been provided wherein light radiations such as infrared radiations may be utilized to detect the presence, form, and/or position of objects obscured from the viewer by a medium not normally transparent to visible light radiations.

It will be obvious to those skilled in the art that the several representative embodiments disclosed are merely exemplary, and that they are susceptible of modification and variation within the spirit and scope of the invention. For example, the detecting device 14 of Figs. 1 and 2 may be adjustably mounted within the cold telescope 10. Further, the cold telescope of the invention may be of a sealed vacuum type construction enclosing the optical system, scanning means and/or detector, with a window pervious to the desired radiations mounted in the opening to the tubular portion of the subnormally cooled chamber. In such an arrangement the positioning of the optical system and the detector may be controlled by any suitable external means, such as electromagnetic field control apparatus whereby the individual lenses and/or the detector may be moved within the subnormally cooled chamber. Also it may be desirable to transmit the visible image by means of conventional television techniques to a location remote from the detecting apparatus of the invention. Therefore, the invention is not deemed to be limited except as defined in the appended claims.

I claim:

1. Apparatus for detecting an invisible field of images by light radiations through a medium not normally transparent to visible light radiations, comprising means for detecting the light radiations, means for focusing the light radiations on said detecting means, and means for subnormally cooling the light radiations prior to detection by said detecting means, said detecting means including a plurality of photo-heat expansion elements and means for visually indicating changes in the position of said photo-heat expansion elements thereby defining images in said invisible field of images.

2. Apparatus for detecting an invisible field of images by light radiations through a medium not normally transparent to visible light radiations, comprising means for detecting the light radiations, means for focusing the light radiations on said detecting means, and means for subnormally cooling the light radiations prior to detection by said detecting means, said detecting means including a screen of electrical resistance elements adapted to change their electrical resistance characteristics in response to variations in the temperature of the radiations focused thereon, means for amplifying said resistance changes, a viewing screen, and means for projecting visible light radiations proportional to said resistance changes upon said viewing screen.

3. Apparatus for scanning an invisible field of images by light radiations through a medium not normally transparent to visible light radiations, comprising means for detecting the light radiations, scanning means for scanning portions of the invisible field, means for focusing light radiations upon said detecting means and means for subnormally cooling the light radiations prior to detection by said detecting means, said detecting means including a plurality of thermoelectric elements exposed to said focused light radiations, a viewing screen, and means responsive to the activation of said thermoelectric elements by said focused light radiations for projecting visible light radiations upon said viewing screen, said projecting means being operated in synchronism with said scanning means.

4. Apparatus for scanning an invisible field of images by light radiations through a medium not normally transparent to visible light radiations, comprising a subnormally cooled chamber, means for directing light radiations through said subnormally cooled chamber, means for scanning the light radiations, means for optically reinforcing and condensing said scanned light radiations directed through said subnormally cooled chamber, means for generating a visible image from said optically reinforced and condensed light radiations, and means for spatially determining the image in cooperation with said scanning means.

5. Apparatus for scanning an invisible field of images by infrared radiations through a medium not normally transparent to visible light radiations, comprising a subnormally cooled chamber, means for directing infrared radiations through said subnormally cooled chamber, expansion means responsive to said infrared radiations passing through said subnormally cooled chamber, a cold light source adapted to cast a beam of cold light on said expansion means, and means for detecting activation of said expansion means as a result of changes in appearance of said cold light reflected from said expansion means.

References Cited in the file of this patent

UNITED STATES PATENTS

| | | |
|---|---|---|
| 2,032,588 | Miller, Jr. | Mar. 3, 1936 |
| 2,155,471 | Cawley | Apr. 25, 1939 |
| 2,562,525 | Cary | July 31, 1951 |
| 2,623,183 | Buck | Dec. 23, 1952 |
| 2,671,154 | Burstein | Mar. 2, 1954 |